United States Patent
Faroon et al.

(10) Patent No.: US 12,509,364 B2
(45) Date of Patent: Dec. 30, 2025

(54) DEVICE AND METHOD FOR MONITORING A SOFTENING UNIT FOR WATER

(71) Applicant: VIVONIC GMBH, Sailauf (DE)

(72) Inventors: Yahya Faroon, Greven (DE); Jürgen Schwerdhöfer, Marktheidenfeld (DE)

(73) Assignee: VIVONIC GMBH, Sailauf (DE)

( * ) Notice: Subject to any disclaimer, the term of this patent is extended or adjusted under 35 U.S.C. 154(b) by 383 days.

(21) Appl. No.: 18/248,890

(22) PCT Filed: Oct. 14, 2021

(86) PCT No.: PCT/EP2021/078427
§ 371 (c)(1),
(2) Date: Apr. 13, 2023

(87) PCT Pub. No.: WO2022/079158
PCT Pub. Date: Apr. 21, 2022

(65) Prior Publication Data
US 2023/0382767 A1   Nov. 30, 2023

(30) Foreign Application Priority Data
Oct. 15, 2020   (DE) .................. 10 2020 127 198.0

(51) Int. Cl.
*C02F 1/42*   (2023.01)
*C02F 1/00*   (2023.01)
(Continued)

(52) U.S. Cl.
CPC ............. *C02F 1/008* (2013.01); *C02F 1/42* (2013.01); *C02F 1/441* (2013.01); *G01G 19/40* (2013.01);
(Continued)

(58) Field of Classification Search
CPC .. C02F 1/008; C02F 1/42; C02F 1/441; C02F 2103/026; C02F 2209/001; C02F 2209/44;
(Continued)

(56) References Cited

U.S. PATENT DOCUMENTS

| | | | | |
|---|---|---|---|---|
| 1,982,961 A | * | 12/1934 | Marsh .................. | C02F 1/42 210/123 |
| 6,783,684 B2 | * | 8/2004 | Teel, Jr. .............. | B01J 49/85 210/85 |
| 2004/0079700 A1 | * | 4/2004 | Wood .................. | B01D 61/10 210/257.2 |
| 2015/0014068 A1 | * | 1/2015 | Volker ................. | G01G 21/22 177/244 |

(Continued)

FOREIGN PATENT DOCUMENTS

| | | | | |
|---|---|---|---|---|
| DE | 102017219063 A1 | * | 4/2019 | ............. B01J 49/85 |
| EP | 3476807 | | 5/2019 | |

(Continued)

OTHER PUBLICATIONS

English translation of patent publication JPH07270213, published Oct. 20, 1995. (Year: 1995).*

(Continued)

*Primary Examiner* — Joseph W Drodge
(74) *Attorney, Agent, or Firm* — Kilyk & Bowersox, P.L.L.C.

(57) ABSTRACT

The present invention relates to a device for monitoring a softening device for water, wherein the softening device has a tank for sole for the regeneration of at least one ion exchange element of the softening device, and wherein the device has a scale and is configured to detect the weight of the tank and preferably to determine time changes in the weight of the tank. Another aspect of the invention relates to a method of monitoring a softening device for water.

20 Claims, 4 Drawing Sheets

Figure 1:
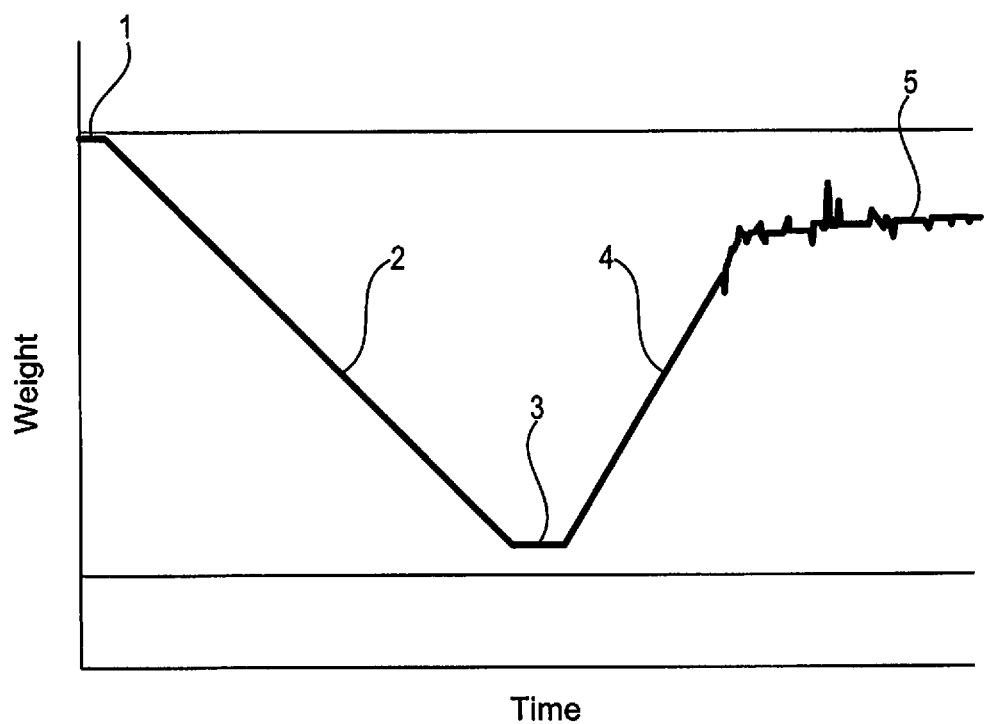

(51) Int. Cl.
*C02F 1/44* (2023.01)
*G01G 19/40* (2006.01)
*G01G 23/38* (2006.01)
*C02F 103/02* (2006.01)

(52) U.S. Cl.
CPC ........ *G01G 23/38* (2013.01); *C02F 2103/026* (2013.01); *C02F 2209/001* (2013.01); *C02F 2209/44* (2013.01); *C02F 2303/16* (2013.01); *C02F 2303/22* (2013.01)

(58) Field of Classification Search
CPC .............. C02F 2303/16; C02F 2303/22; C02F 2001/422; C02F 2001/425; C02F 2001/427; C02F 2209/01; C02F 2209/42; B01D 24/48; B01D 24/4869; B01J 49/75; B01J 49/80; B01J 49/85; G01G 19/40; G01G 23/18
See application file for complete search history.

(56) References Cited

U.S. PATENT DOCUMENTS

| | | | |
|---|---|---|---|
| 2015/0274545 A1* | 10/2015 | Lim | C02F 1/42 210/97 |
| 2017/0217797 A1* | 8/2017 | Cope | C02F 1/42 |
| 2019/0352198 A1* | 11/2019 | Balidas | B01J 39/07 |

FOREIGN PATENT DOCUMENTS

| | | | |
|---|---|---|---|
| EP | 3524577 | 8/2019 | |
| JP | H7270213 A * | 10/1995 | G01F 23/14 |

OTHER PUBLICATIONS

English translation of patent publication EP3524577B1, published Mar. 10, 2021. (Year: 2021).*
English translation of Publication DE_102017219063_A1, Apr. 25, 2019 (Year: 2019).*

* cited by examiner

DEVICE AND METHOD FOR MONITORING A SOFTENING UNIT FOR WATER

The present invention relates to a device and to a method for monitoring a softening device for water.

Water is softened for a number of applications to prevent the formation of deposits in the form of limescale in lines and appliances. In the course of softening, ion exchange resins are typically used that reversibly bind calcium ions and magnesium ions contained in the water and thus remove them from the water flowing pas the ion exchange resins.

A sodium chloride solution or sole that is conducted past the ion exchange resins is used for the regeneration of the ion exchange resins. The calcium ions and magnesium ions bound to the ion exchange resin are replaced with sodium ions from the sole and the ion exchange resin can again be used for water softening. The sodium chloride solution used typically has an NaCl concentration of 8-12% parts by weight.

In practice a softening device for water conventionally requires a manual monitoring; for example, the salt level in the sole tank has to be regularly checked manually. It has furthermore been found that due to blockages of the pipework of conventional softening devices, the regeneration process is frequently incorrectly carried out, for example in that only an insufficient amount of sole is used in a regeneration process or an excessively large amount of sole is consumed. Such errors, for example, result in a reduced softening performance or in an excessive consumption of the softening device.

It is the underlying object of the present invention to alleviate or even fully eliminate the problems that occur in the prior art. It is in particular the underlying object of the present invention to reliably monitor and ensure the function of a softening device with a very large reduction of manual worksteps.

This object is achieved by the invention in accordance with the independent claims. Advantageous further developments of the invention are the subject of the dependent claims.

A first aspect of the invention relates to a device for monitoring a softening device for water, wherein the softening device has a tank for sole for the regeneration of at least one ion exchange element of the softening device, and wherein the device has a scale and is configured to detect the weight of the tank and preferably to determine time changes in the weight of the tank.

A device in accordance with the invention thus monitors the weight of the sole tank and/or of a salt container of the softening device by means of a scale. The scale is preferably electronic and the monitoring of the weight of the sole tank and/or of the salt container preferably automatically takes place continuously or at predefined time intervals. A manual or visual monitoring of the filling level of the sole tank and/or of the salt container is thus dispensed with.

The device preferably has an evaluation unit that is configured to determine the weight of the tank before and after a process of regeneration of the at least one ion exchange element by means of sole and to determine a difference of the determined weights.

In other words, a first weight of the sole tank and/or of the salt container is detected before sole for the regeneration of the ion exchange element is removed and then a second weight of the sole tank and/or of the salt container is detected after sole for the regeneration of the ion exchange element has been removed.

The amount of the required sole or of the required salt per regeneration process can be determined from the difference of the first and second weights. The sole or salt consumption of the softening device for a specific time unit can be estimated or determined from this when the frequency of the regeneration processes is known. In addition, if the determined amount of the required sole or the required salt per regeneration process does not coincide with expected specific consumption values of the softening device or if it falls in a specific tolerance range, a conclusion can be drawn on an incorrect setting or parameterization of the softening device or of its defective function.

The evaluation unit is furthermore preferably configured to determine for how many regeneration processes there is sufficient stock of the sole or salt on the basis of the detected weight of the tank or container and, on a reaching and/or not reaching of a predetermined minimum number of regeneration processes, to output a prompt to a user to top up sole and/or salt in the tank or container.

Alternatively or additionally, the evaluation unit can also be configured to actuate an output as to when the next topping up of sole and/or salt has to take place on the basis of the detected weight of the tank or container and of the determination of for how many regeneration processes sufficient sole or salt is available ("predictive maintenance").

It has furthermore been found to be advantageous if the evaluation unit is furthermore configured to detect an increase in the weight change of the tank for sole, in particular during a process of the regeneration of the at least one ion exchange element by means of sole.

The weight of the sole tank initially reduces linearly during a regeneration process since sole is pumped out of the tank to the ion exchange element. Water is thereupon fed into the sole tank in which salt from the salt container dissolves and so replaces the removed sole. The weight of the sole tank increases linearly during the feeding process. A substantially V-shaped curve thus results due to the linear decrease and the linear increase of the weight of the sole tank.

A plateau phase without a weight change of the sole tank can be provided between the linear decrease and the linear increase since no liquid is moved out of or into the sole tank in this phase. The length of the plateau phase is arbitrary and can be minimal since the regeneration already takes place when the sole already removed from the tank flows through the ion exchange element.

A conclusion can be drawn on flow restrictions in the pipework or on valve malfunctions, in particular valve contamination, from the determined positive or negative gradient of the weight change of the tank for sole on a removal or feed of liquid from or into the sole tank.

For this purpose, the evaluation unit is preferably configured to compare the gradient of the weight change of the tank for sole with a reference value, with the reference value preferably corresponding to a removal rate of sole from the tank or to a feed rate of liquid, in particular water, into the tank.

If the detected weight change of the sole tank remains behind a weight change expected on the basis of a set feed rate or removal rate, a conclusion can be drawn on a feed line or discharge line of the sole tank being constricted and/or on valves in the flow from or to the sole tank not working properly.

If the detected weight change of the sole tank exceeds a weight change expected on the basis of a set feed rate or removal rate, a conclusion can be drawn on further valves being open in an unplanned manner that permit additional fluid flow or on the settings of a pump not coinciding with the specifications.

In accordance with a further advantageous embodiment of the invention, the evaluation unit is furthermore configured to evaluate a plurality of processes of regeneration of the at least one ion exchange element by means of sole together and to determine at least one trend of a parameter of the monitored softening device on the basis of the common evaluation.

It has furthermore proved to be advantageous if the device furthermore comprises a documentation unit that is configured to store, preferably automatically, the data detected and/or determined by the device in an electronic log book and/or to transfer them to a reception device. The detected or determined data are preferably stored with a time stamp in the context of a device in accordance with the invention or of a method in accordance with the invention.

The device thus preferably documents the monitoring of the softening device independently and without any manual intervention; for example, an inventory or a status report of the monitored softening device can be stored at predetermined time intervals.

The device can transfer the detected and/or determined data to one or more reception devices in response to a user input and/or at predetermined time intervals.

The detected and/or determined data can furthermore be displayed on the device itself and/or on the reception device(s). A user can thus also remotely obtain a picture of the current, previous, or also future (based on a trend analysis) status of the softening device. A device in accordance with the invention is thus configured for remote diagnosis.

A device in accordance with the invention can be a separately configured part or a part of a water preparation system, in particular a pure water production system such as a reverse osmosis system or a distillation system or flash distillation system. The device in accordance with the invention can also be a prefiltration system of a water preparation system or of another monitoring device, for example for measuring the ion content of water (hardness, chlorine content, etc.).

An aspect of the invention thus relates to a water preparation system, in particular to a pure water production system such as a distillation system or a reverse osmosis system or a prefiltration system of such a water preparation system using a device in accordance with the invention.

Another aspect of the invention relates to a method of monitoring a softening device for water, in particular by means of a device in accordance with the invention, wherein the softening device has a tank for sole for regeneration of at least one ion exchange element of the softening device and the method comprises the steps: detecting the weight of the tank by means of a scale and preferably determining time changes of the weight of the tank.

The detection of the weight of the tank preferably takes place automatically or independently without human intervention, continuously or at predetermined time intervals. A detection of the weight of the tank can, for example, be started simultaneously with a regeneration process of the at least one ion exchange element.

The method preferably furthermore comprises the steps: determining for how many regeneration processes there is sufficient stock of the sole on the basis of the detected weight of the tank or, on a reaching and/or not reaching of a predetermined minimum number of regeneration processes, outputting a prompt to a user to top up sole and/or salt in the tank or container.

The method in accordance with the invention thus enables an intelligent inventory management in which top up processes can be predicted and can be carried out in a direct manner. It is furthermore ensured that the required amount for a desired number of regeneration processes is always available. The regeneration and thus the functional capability of the at least one ion exchange element of the softening device can thus be ensured.

Even if the amount of salt or sole required per generation process were to change over time, this can be detected by means of the device in accordance with the invention or of the method in accordance with the invention and can be taken into account on the determination of the point in time of the next required top up process.

A method in accordance with the invention can furthermore comprise the following step: detecting a gradient of the weight change of the tank for sole, in particular during a process of regeneration of the at least one ion exchange element by means of sole.

A conclusion can be drawn on flow restrictions in the pipework or on valve malfunctions, in particular due to deposits in the pipes, on an insufficient opening or closing of the valves or on valve contamination from the determined positive or negative gradient of the weight change of the tank for sole on a removal or feed of liquid from or into the sole tank.

A method in accordance with the invention preferably comprises the step: comparing the gradient of the weight change of the tank for sole with a reference value, with the reference value preferably corresponding to a removal rate of sole from the tank or to a feed rate of liquid, in particular water, into the tank.

In other words, the detected weight change, in particular its gradient, is compared with a weight change expected on the basis of the settings of the softening device.

The comparison can be an exact comparison in the context of a device in accordance with the invention or of a method in accordance with the invention (do the curves exactly coincide?) or can take account of a tolerance range (do the curves substantially or sufficiently coincide?).

If the comparison produces a difference of the actually detected weight change from the expected weight change and/or from a tolerance range, an automatic documentation of this event and/or an output to a user preferably takes/take place.

A plurality of processes of regeneration of the at least one ion exchange element by means of sole are preferably evaluated together with respect to the detected weight changes of the tank (for example the weight difference before and after the regeneration process and/or the weight change of the tank during the regeneration process) and at least one trend of a parameter of the monitored softening device (for example material consumption, flow rates through the feed line and discharge line of the tank for sole) are determined on the basis of the common evaluation in the course of the method in accordance with the invention.

Predictions for the future operation or for the future function of the softening device can be made by means of the at least one trend. Top up processes and/or service work can thus be planned; for example, a line cleaning can be set for a time at which experience has shown that the flow rate through the sole removal line falls below a predetermined desired value or tolerance range due to deposits in the line.

The trend can, for example, be the sole consumption per regeneration process that is determined on the basis of the weight difference before and after the regeneration process. The sole consumption per regeneration process can increase over time, for example, since the valve closing the sole removal line closes more slowly or only closes insufficiently over time.

The sole consumption per regeneration process can also reduce over time, for example in that the flow cross-section of the sole removal line constricts with increasing deposits in the line or a valve closing the sole removal line only releases the line with a delay or insufficiently due to deposits or an incorrect control.

If only an insufficient amount of sole is provided per regeneration process, only an insufficient regeneration of the ion exchange element of the softening device takes place and the softening performance reduces. The present invention thus enables a diagnosis when it has been found that the softening performance of the softening device decreases.

A device in accordance with the invention and/or a method in accordance with the invention can therefore be used in interaction with a device for measuring the water hardness that checks the product water of the softening device for its hardness. If a difference of the hardness of the product water from a desired value is detected, a check can be made, preferably fully automatically, by means of the present invention as to whether the defective softening performance comprises an insufficient provision of sole for the regeneration. Salt and/or sole can thereupon be topped up in a direct manner and the lines and valves can be checked for deposits or malfunctions.

Provision is preferably made in the course of a method in accordance with the invention that the detected and/or determined data are preferably automatically stored in an electronic log book and/or are transferred to a reception device.

The data can be stored continuously or at predetermined time intervals or on the satisfaction of a specific condition (e.g. start of a regeneration process). The electronic log book can preferably be remotely accessed so that the status of the softening device can be remotely monitored and documented.

In the context of a device in accordance with the invention or of a method in accordance with the invention, automatic reports can thus likewise be prepared on the status of the softening device, for example on the operation, services, regeneration processes and/or the material consumption and can, for example, be transmitted to the reception device.

The reception device can be a smartphone or tablet, a computer, or another device suitable for the reception of data.

A device in accordance with the invention and/or a method in accordance with the invention is/are preferably used in the medical sector, in particular in the preparation of water for medical applications, in particular in the generation of dialysis water.

Figure 2:
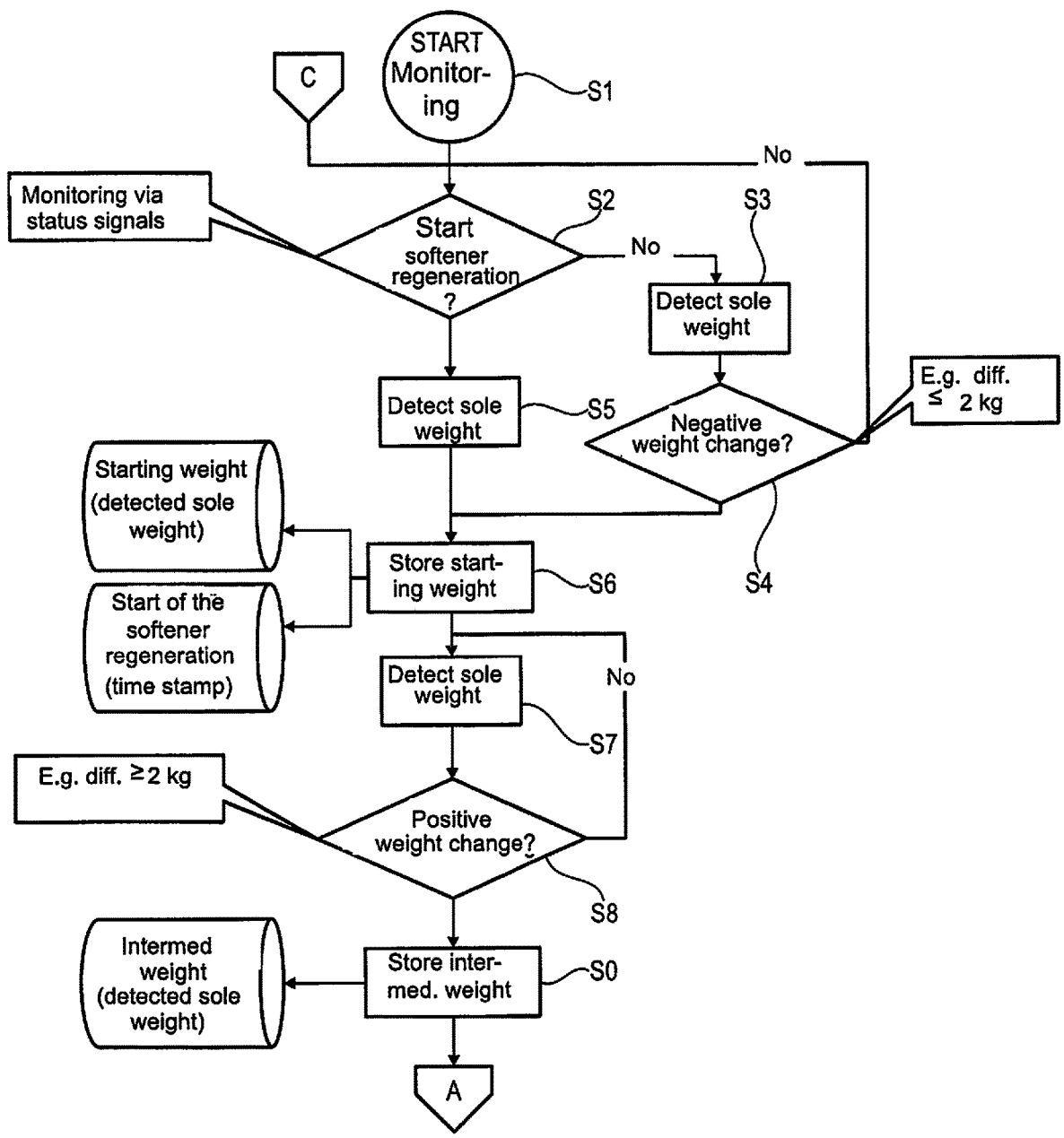
Figure 3:
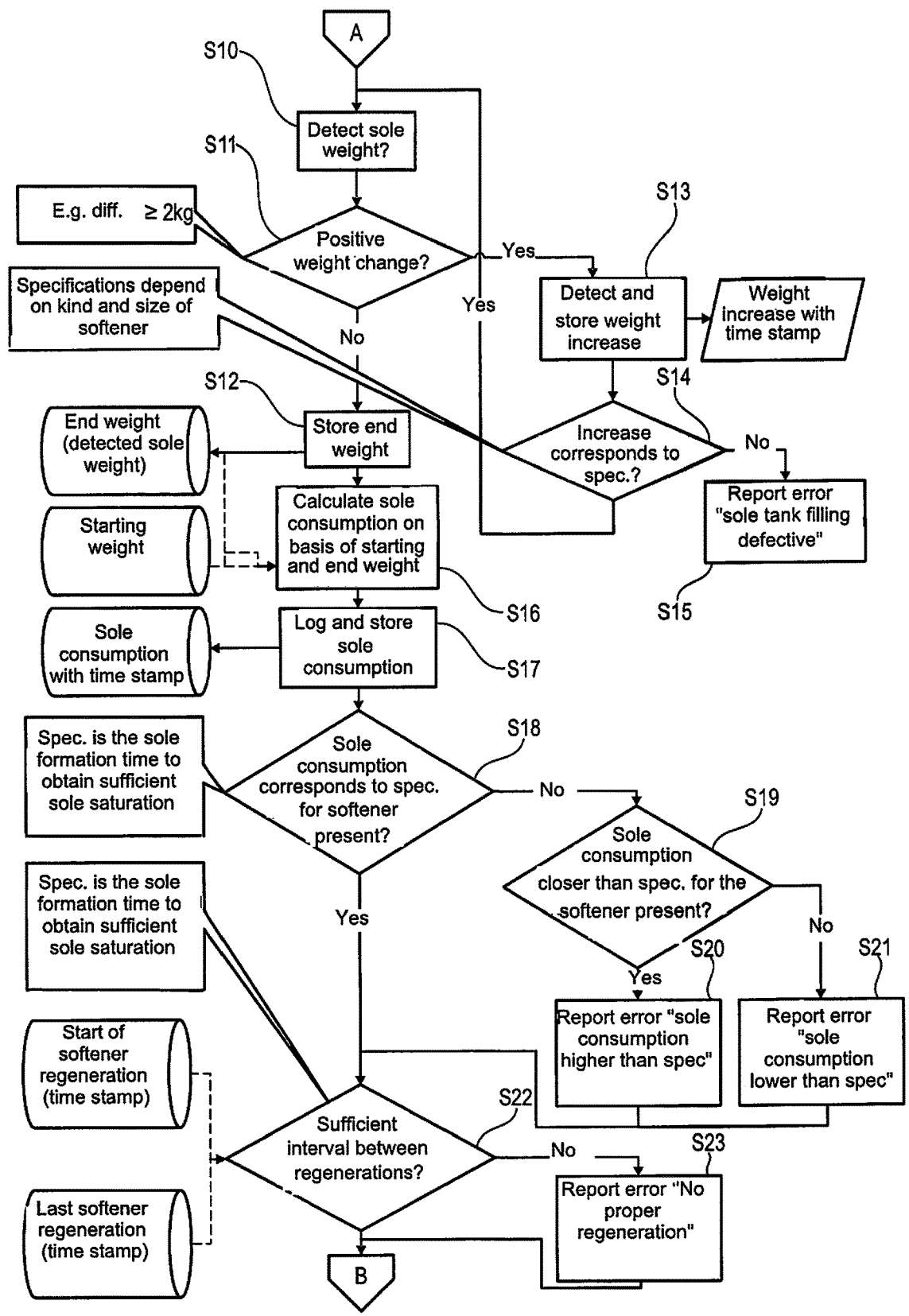
Figure 4:
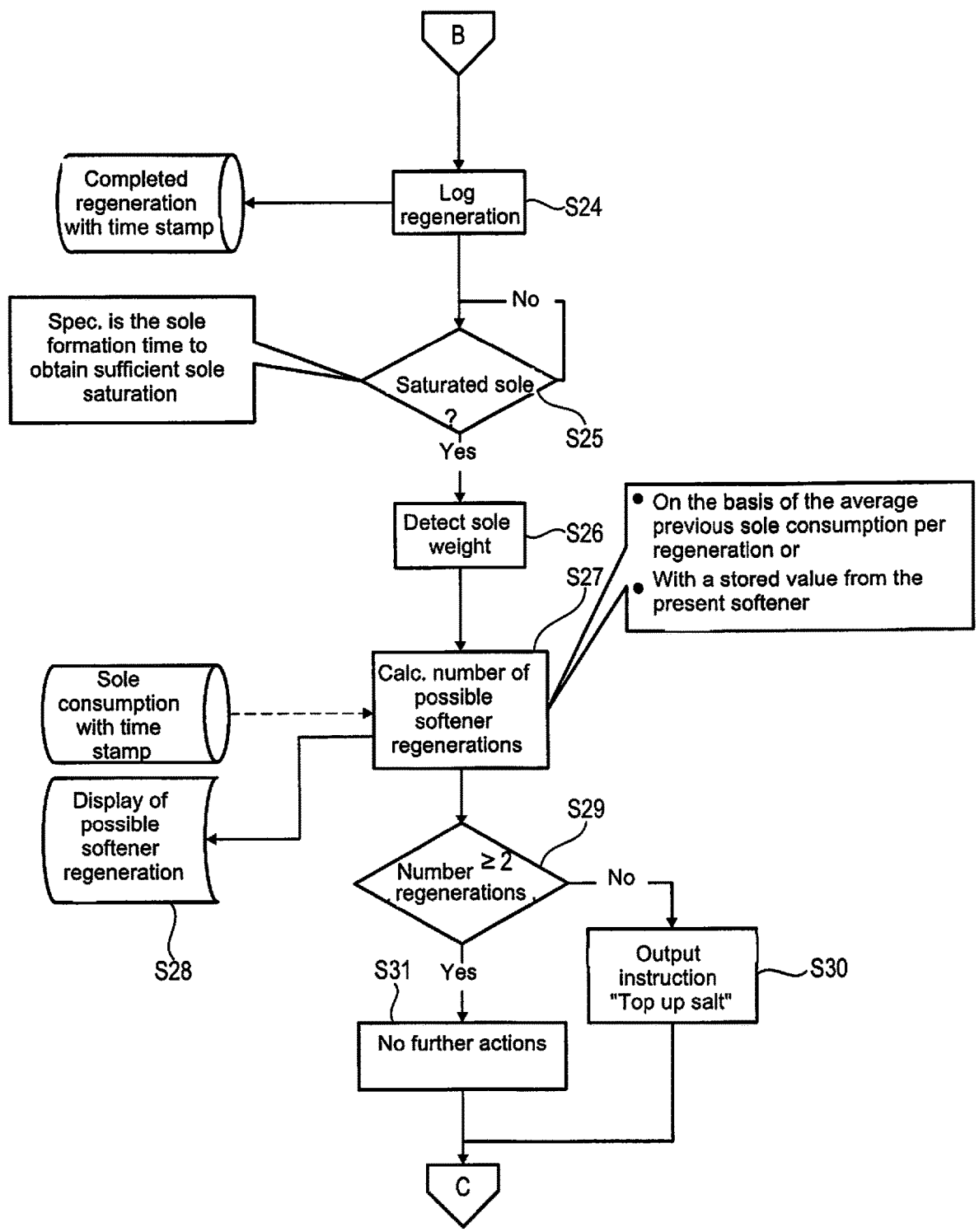

Further advantages, features, and effects of the present invention result from the following description of embodiments of the invention with reference to the Figures. There are shown:

FIG. 1 a weight progression of a sole tank during a regeneration process;

FIG. 2 a first stage of a monitoring method in accordance with the invention;

FIG. 3 a second stage of a monitoring method in accordance with the invention; and FIG. 4 a third stage of a monitoring method in accordance with the invention.

As shown in FIG. 1, the weight of the sole tank initially linearly decreases during the regeneration process starting from a plateau 1 (see the linear drop of the measured weight marked by reference numeral 2) since sole is pumped out of the tank to the ion exchange element. The plateau 1 reflects the weight of the tank before the regeneration process.

The weight of the tank reaches a second plateau 3 without a weight change of the sole tank after the removal process since no liquid is moved out of or into the sole tank in this phase. The length of the plateau phase is arbitrary and can be minimal since the regeneration already takes place when the sole already removed from the tank flows through the ion exchange element.

Water is thereupon fed into the sole tank in which salt from the salt container dissolves and so replaces the removed sole. The weight of the sole tank increases linearly starting from the plateau 3 during the feed process see the linear increase of the measured weight marked by reference numeral 4) until a third plateau 5 is reached. The plateau 5 reflects the weight of the tank after the regeneration process. A substantially V-shaped curve thus results due to the linear decrease and the linear increase of the weight of the sole tank.

If a difference of the weight of the plateau 1 (before the regeneration process) and the weight of the plateau 5 (after the regeneration process) is determined, the consumption of sole during the regeneration process can be determined.

In addition, the gradient or the steepness of the flanks 2 and/or 4, or in other words the weight change during the removal and/or filling phases of the sole tank, can be determined. A conclusion can, for example be drawn from the gradient of the flanks or of the weight change on the setting of the monitored softening device and its pumps, on the state of the lines and valves, and on similar parameters of the softening device.

FIG. 2 shows a first stage of a monitoring method in accordance with the invention; The monitoring of the softening device is started in Step S1. It is first detected in Step S2 whether a regeneration process of the ion exchange element, for example one or more cartridges, is started.

If it is detected in step S2 that no regeneration process has started, the weight of the sole tank is detected in Step S3, and is compared with an expected value in Step S4. If the comparison in Step S4 does not produce any negative weight changes (constantly a large amount of sole in the tank), the method is continued at Step S2.

If it is detected in step S2 that a regeneration process has started, the weight of the sole tank is detected in Step S5, and the weight is stored as the starting weight of the sole tank in Step S6.

If the comparison in Step S4 produces a negative weight change (e.g. a decrease of the weight by 2 kg or more), the detected weight is likewise stored as the starting weight of the sole tank in Step S6.

A time stamp of the start of the regeneration process is stored, for example in a database, in addition to the starting weight of the sole tank in Step S6. The starting weight, for example, corresponds to the weight of the tank during the first plateau 1 in FIG. 1.

The weight of the sole tank is thereupon detected again in Step S7. A check is made in Step 8 whether a positive weight change, e.g. a weight change of plus 2 kg or more, is present relative to the stored starting weight.

If no such positive weight change can be detected, Step S7 is repeated. If such a positive weight change can be detected, the detected weight of the sole tank is stored as an intermediate weight in Step S9. The intermediate weight, for example, corresponds to the weight of the tank during the second plateau 3 in FIG. 1.

As shown in FIG. 3, the weight of the sole tank is thereupon detected again in Step S10. It is determined in Step S11 whether a positive weight change, for example of 2 kg or more, is present relative to the starting weight and/or the intermediate weight.

If no such positive weight change can be determined, the detected weight of the sole tank is stored as the end weight in Step S12.

If such a positive weight change can be determined in Step S11, the weight increase, preferably the gradient of the weight change, is detected and is stored together with a time stamp in Step S13.

The determined gradient or the increase of the weight change is compared with at least one expected value or reference value in Step S14. The expected value or reference value depends on the properties of the monitored softening device, in particular on its ion exchange elements, e.g. its size and kind.

If the gradient determined in Step S14 corresponds to the expected value or reference value, the method continues on at Step S10.

If the gradient determined in Step S14 does not correspond to the expected value or reference value, an output in from of an error message that the sole tank filling is defective takes place in Step S15.

After the saving of the detected weight of the sole tank as the end weight in Step S12, with the end weight, for example, corresponding to the weight of the tank at the third plateau 5 in FIG. 1, the sole consumption during the last regeneration process is calculated in Step S16 on the basis of the stored starting weight and the stored end weight.

The determined sole consumption is automatically logged in Step S17 and is stored with a time stamp. The determined sole consumption is thereupon compared with an expected value or reference value in Step S18. The expected value or reference value can preferably reflect or take account of a sole formation time that is necessary to produce a sufficient amount of saturated soles.

If Step S18 produces a difference between the determined sole consumption and the expected value or reference value, a check is made in Step S19 whether the determined sole consumption is above the expected value or reference value or a tolerance range.

If it is, for example, determined in Step 19 that the sole consumption is higher than the expected value or reference value, this can indicate that so much sole has been consumed in the detected time period that a sufficient amount of sole cannot be produced again within the expected sole formation time and it is thus to be expected that the regeneration of the ion exchange element and thus the softening performance of the softening device deteriorates. A corresponding output that the sole consumption is higher than expected or specified is made in Step S20.

If it is determined in step 19 that the sole consumption is not higher than the expected value or reference value, a corresponding output that the sole consumption is lower than expected or specified is made.

When the sole consumption does not reach the expected value or reference value or is not higher than the expected value or reference value, this, for example, indicates an improper regeneration of the ion exchanger. The real softening performance of the ion exchanger is thus, for example, lower than the nominal softening performance of the ion exchanger.

An output can optionally take place that no proper regeneration of the ion exchange element has taken place. Alternatively or additionally, the output can take place that the real softening performance of the ion exchange element is lower than the nominal softening performance of the ion exchange element.

If Step S18 does not produce any difference between the determined sole consumption and the expected value or reference value, a check is made in Step S22 whether there is a sufficient time interval from the preceding regeneration process, in particular whether the time that has elapsed since the preceding regeneration process at least corresponds to the sole formation time so that a sufficient amount of saturated sole was available for the regeneration process.

Use is made in Step S22 of the stored time stamp of the start of the regeneration from S6 and the time stamp of the preceding regeneration.

If it is determined in Step S22 that a sufficient interval from the last regeneration process was not observed, an output is made in Step S23 that no proper generation has taken place.

If it is determined in Step S22 that a sufficient interval from the last regeneration process has been observed, the regeneration process is logged in Step S24 in FIG. 4, in particular all the detected and/or determined data of this regeneration process are documented and/or stored. In addition, the conclusion of the regeneration process is stored together with a time stamp.

It is thereupon detected in Step S25 whether saturated sole is present in the tank. A check can, for example, be made whether a specific sole formation time has elapsed that is necessary for the sole in the tank to reach saturation.

If the check in Step S25 has the result that saturated sole is present in the tank, the weight of the sole tank and thus the sole contained therein is detected in Step S26.

A calculation is made in Step S27 on the basis of a sole consumption stored with a time stamp as to for how many regeneration processes the sole amount present in the tank detected in Step S26 is sufficient.

The calculation here can take place on the basis of a determined average sole consumption per regeneration process in the past and/or a value of the sole consumption stored for the specific softening device and/or the for the specific ion exchange element can be taken into account.

A display of the calculated number of the regeneration processes possible with the sole amount detected in Step S27 takes place in Step S28.

A check is made in Step S29 whether the calculated number of the regeneration processes possible with the sole amount detected in Step S27 is above a minimal value, for example a value of two regeneration processes.

If it is detected in Step S29 that the calculated number of regeneration processes possible with the sole amount detected in Step S27 is below the minimal value, an output is made in Step S30 by means of which a user is prompted to top up salt.

If it is detected in Step S29 that the calculated number of regeneration processes possible with the sole amount detected in Step S27 is above the minimal value, no further actions take place in accordance with Step S31 and the process ends at C.

The invention claimed is:

1. A device for monitoring a softening device for water, wherein the softening device comprises a sole tank and at least one ion exchange element, the sole tank being for regeneration of the at least one ion exchange element,
the device comprising a scale, the device being configured to detect weight of the sole tank and to determine changes of the weight of the sole tank over time, wherein the device further comprises an evaluation unit that is configured to determine the weight of the sole tank before and after a process of regeneration of the at least one ion exchange element with sole or salt provided by the sole tank and to determine a difference of the determined weights and the evaluation unit is further configured to determine a sufficient amount of the provided sole or salt for a number of regeneration processes on the basis of the detected weight of the sole tank and, on a reaching and/or not reaching of a predetermined minimum number of regeneration processes, to output a prompt to a user to refill sole and/or salt in the sole tank.

2. The device in accordance with claim 1, wherein the evaluation unit is further configured to detect a slope of the weight change of the sole tank during a process of the regeneration of the at least one ion exchange element by the sole or salt.

3. The device in accordance with claim 2, wherein the evaluation unit is further configured to compare a gradient of the weight change of the sole tank with a reference value, with the reference value corresponding to a removal rate of the sole or salt from the sole tank or to a feed rate of liquid into the sole tank.

4. The device in accordance with claim 1, wherein the evaluation unit is further configured to evaluate a plurality of processes of regeneration of the at least one ion exchange element by the sole or salt together and to determine at least one trend of a parameter of the monitored softening device on a basis of a common evaluation of the plurality of processes.

5. The device in accordance with claim 1, wherein the device further comprises a documentation unit that is configured to store data detected and/or determined by the device in an electronic log book and/or to transfer the data to a reception device.

6. The device in accordance with claim 1, wherein the device is part of a water preparation system, a prefiltration system, a reverse osmosis system, or another monitoring device.

7. A water preparation system or a prefiltration system of a water preparation system, comprising the device of claim 1.

8. A method of monitoring a softening device for water utilizing the device of claim 1, said method comprising: detecting the weight of the sole tank by the scale device and determining time changes of the weight of the sole tank with the evaluation unit.

9. The method in accordance with claim 8, further comprising determining a sufficient amount of sole or salt for a number of regeneration processes on the basis of the detected weight of the sole tank and, on a reaching or not reaching of a predetermined minimum number of regeneration processes, outputting a prompt to a user to top up sole and/or salt in the sole tank.

10. The method in accordance with claim 8, further comprising: detecting a gradient of the weight change of the tank during a process of regeneration of the at least one ion exchange element by the sole or salt.

11. The method in accordance with claim 10, further comprising: comparing the gradient of the weight change of the sole tank with a reference value corresponding to a removal rate of the sole or salt from the sole tank or to a feed rate of liquid into the tank.

12. The method in accordance with claim 8, wherein a plurality of processes of regeneration of the at least one ion exchange element by the sole or salt are evaluated together and at least one trend of a parameter of the monitored softening device is determined on a basis of a common evaluation.

13. The method in accordance with claim 8, further comprising: storing detected and/or determined data in an electronic log book and/or transferring the detected and/or determined data to a reception device.

14. The method of claim 8, wherein the method is used in a medical sector for the preparation of water for medical applications.

15. A method of using the device in accordance with claim 1 comprising: preparing water for medical applications using the device.

16. A system for monitoring a softening device for water, wherein the softening device comprises a sole tank and at least one ion exchange element, the sole tank being for regeneration of the at least one ion exchange element,
the system comprising a scale device, the device being configured to detect weight of the sole tank and to determine changes of the weight of the sole tank over time,
wherein the system further comprises an evaluation unit that is configured to determine the weight of the sole tank detected by the scale device before and after a process of regeneration of the at least one ion exchange element with sole provided by the sole tank and to determine a difference of the determined weights,
wherein the system further comprises a device for measuring water hardness, interacting with the scale device, that checks the water of the softening device for water hardness and the evaluation unit determines defective softening performance based on the interaction of the scale device with the device for measuring water hardness.

17. A device for monitoring a softening device for water, wherein the softening device comprises a sole tank and at least one ion exchange element, the sole tank being for regeneration of the at least one ion exchange element,
the device comprising a scale, the device being configured to detect weight of the sole tank and to determine changes of the weight of the sole tank over time,
wherein the device further comprises an evaluation unit that is configured to determine the weight of the sole tank detected by the scale before and after a process of regeneration of the at least one ion exchange element by sole or salt provided by the sole tank and to determine a difference of the determined weights, and
wherein the evaluation unit is further configured to evaluate a plurality of processes of regeneration of the at least one ion exchange element by the sole or salt together and to determine at least one trend of a parameter of the monitored softening device on a basis of the evaluation.

18. The device in accordance with claim 17, wherein the evaluation unit is further configured to determine a sufficient amount of sole or salt for a number of regeneration processes on the basis of the detected weight of the sole tank and, on a reaching and/or not reaching of a predetermined minimum number of regeneration processes, to output a prompt to a user to refill sole and/or salt in the sole tank.

19. The device in accordance with claim 17, wherein the evaluation unit is further configured to detect a slope of the weight change of the sole tank during a process of the regeneration of the at least one ion exchange element by the sole or salt.

20. The device in accordance with claim 17, wherein the device further comprises a documentation unit that is configured to store data detected and/or determined by the device in an electronic log book and/or to transfer the data to a reception device.

\* \* \* \* \*